United States Patent [19]

Engstrom et al.

[11] 3,941,951

[45] Mar. 2, 1976

[54] TELEPHONE STAND

[75] Inventors: John Gordon Engstrom; Gary Merlin Petaja, both of Indianapolis, Ind.

[73] Assignee: Bell Telephone Laboratories, Incorporated, Murray Hill, N.J.

[22] Filed: May 14, 1974

[21] Appl. No.: 469,854

[52] U.S. Cl. .............................. 179/179; 179/100 C
[51] Int. Cl.² .......................................... H04M 1/02
[58] Field of Search ............ 179/179, 100 C, 100 R, 179/100 D, 178, 184

[56] References Cited
UNITED STATES PATENTS

| | | | |
|---|---|---|---|
| 3,073,911 | 1/1963 | Mattke et al. ...................... | 179/100 |
| 3,413,423 | 11/1968 | Stevko ............................ | 179/100 D |

FOREIGN PATENTS OR APPLICATIONS

| | | | |
|---|---|---|---|
| 346,356 | 4/1931 | United Kingdom .................. | 179/179 |
| 1,223,889 | 9/1966 | Germany ......................... | 179/100 D |
| 1,220,897 | 7/1966 | Germany ......................... | 179/100 C |

*Primary Examiner*—Thomas W. Brown
*Attorney, Agent, or Firm*—H. L. Newman

[57] ABSTRACT

A telephone stand is disclosed including a chassis that is enclosed within a housing comprising a cover member and a base member. The chassis is a lattice-like structure including side and end walls at the periphery thereof and at least one intermediate wall extending therebetween. The walls serve as partitions that define open-ended cubicles within which substantially all of the components contained within the housing are mounted. The height of the side, end, and intermediate walls is such that a substantial portion of each component mounted within the confines of the walls is contained within the volume defined by the upper and lower surfaces of the walls. Certain of the components and the cover member and base member are fastened to the walls.

2 Claims, 7 Drawing Figures

TELEPHONE STAND

FIELD OF THE INVENTION

The invention relates to the field of station apparatus and within that field to a telephone stand including an internal chassis on which substantially all of the components contained within the stand are mounted.

DESCRIPTION OF THE PRIOR ART

U.S. Pat. No. 3,413,423 issued to M. J. Steveko on Nov. 26, 1968, discloses a telephone subset including a chassis to which many of the components of the subset are mounted. The chassis is positioned between the upper and lower housing shells of the subset, and it consists of a pair of flat plates that are joined together. The perimeter of each plate has a circumferential flange that extends in the opposite direction from the flange of the other plate, and the flanges are situated outside of the perimeter of the housing shells. The components are secured to the flat portions of the plates, and the height of the flanges is such that only a very small portion of each component secured to the plates is contained within the volume defined by the upper and lower edges of the flanges. Thus, the flanges only serve to provide ornamentation for the exterior of the subset and to conceal the lower edge of the upper housing shell and the upper edge of the lower housing shell.

The upper and lower housing shells of Steveko are not mounted to the chassis, but are instead respectively secured to mounting plates and brackets. In addition, the mounting plates serve as the mounting means for a ring pushbutton, mode lights, and a pushbutton calling device, which components are completely outside the volume defined by the upper and lower edges of the flanges of the chassis.

SUMMARY OF THE INVENTION

A telephone stand in accordance with the present invention includes a chassis comprising a lattice-like structure including side and end walls at the periphery thereof and at least one intermediate wall extending therebetween. The walls serve as partitions that define open-ended cubicles within which substantially all of the components are mounted. The height of the side, end, and intermediate walls is such that a substantial portion of each component mounted within the confines of the walls is contained within the volume defined by the upper and lower surfaces of the walls.

As a result, in contrast to the chassis described in Steveko, the side, end, and intermediate walls serve as a protective shield for substantially all of the components mounted on the chassis. The chassis protects the components as they are assembled to the chassis in the usual assembly-line fashion.

The side, end, and intermediate walls, in addition to providing cubicles within which the components can be protectively mounted, also provide multiple mounting surfaces on both the upper and lower ends thereof that facilitate efficient use of the volume contained within the telephone set housing. Thus, in accordance with the invention, certain of the components and the cover member and base member that comprise the housing of the telephone stand are fastened to the walls. Furthermore, the chassis is enclosed within the cover and base members so that the chassis forms no part of the exterior ornamentation of the telephone stand. Consequently, the chassis is not subject to damage or wear that could lead to its replacement merely because of its appearance rather than because of any structural failure.

DETAILED DESCRIPTION OF THE INVENTION

Figure 1:
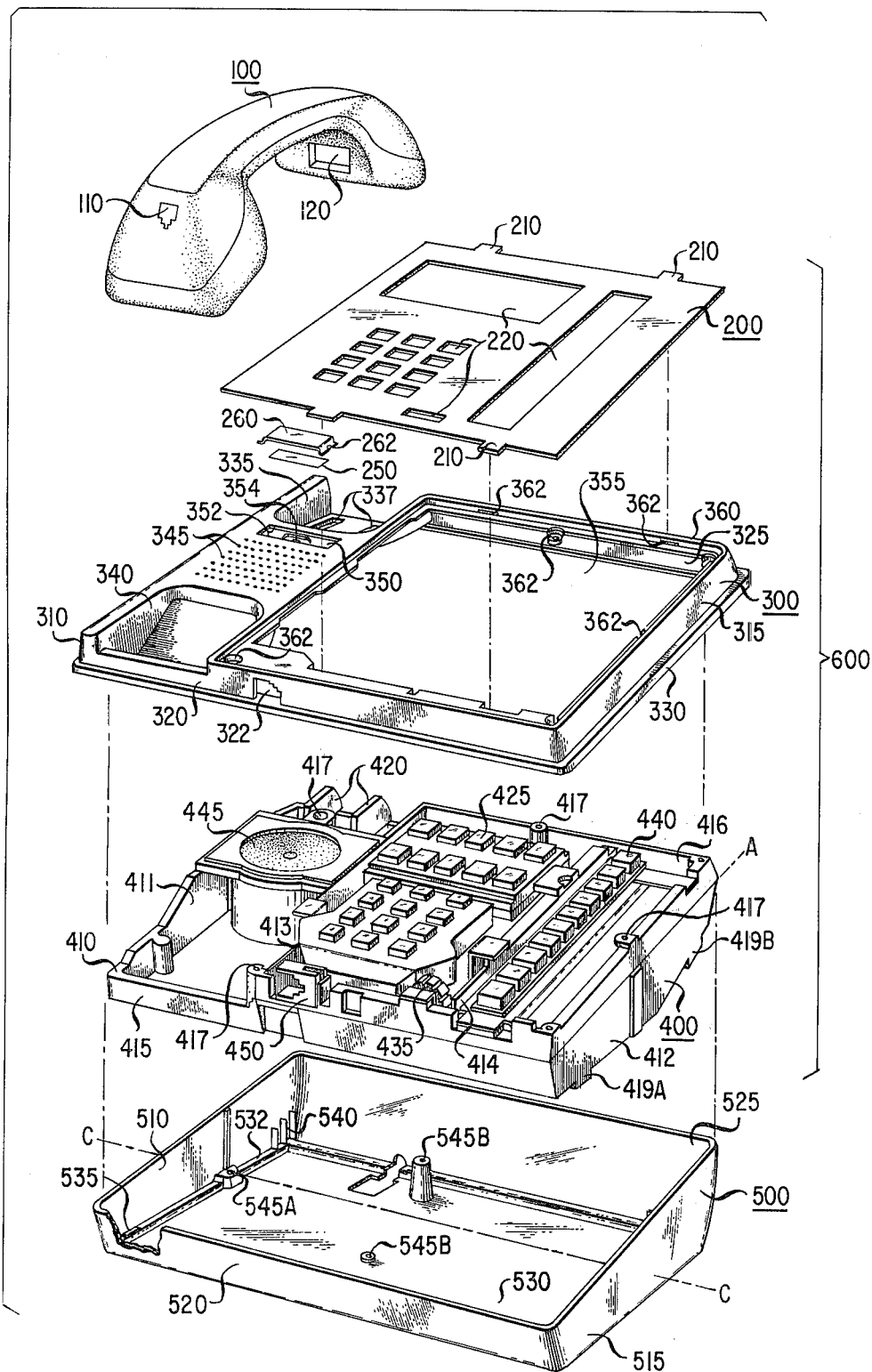
FIG. 1 is an exploded perspective view showing the handset, faceplate, cover member, component assembly, and base member of a telephone set embodying the present invention, parts being broken away for greater clarity.

Referring to FIG. 1 of the drawing, a telephone set in accordance with the present invention comprises a handset 100 and a telephone stand including a faceplate 200, a cover member 300, a component assembly 400, and a base member 500. The cover member 300 comprises a hollow rectangular shell including a pair of spaced opposed side wall portions 310 and 315 extending orthogonally to a pair of spaced opposed end wall portions 320 and 325. The undersurfaces of the side and end wall portions 310, 315, 320, and 325 essentially lie in a common plane and a planar rectangular flange 330 is secured thereto, the flange protruding outwardly from the wall portions. In addition, the end wall portion 325 is of greater height than the end wall portion 320 whereby the cover member 300 has a wedge-shaped profile, the upper surface of the cover member extending at an angle of 3° to the plane of the flange 330.

The upper surface of the cover member 300 is provided with an ear piece well 335 and a mouth piece well 340 for respectively accommodating the ear piece and mouth piece portions of the handset 100, and the ear piece well includes a pair of line switch plunger openings 337. The portion of the cover member 300 between the ear piece and mouth piece wells 335 and 340 has an array of acoustic perforations 345 extending therethrough, and a fine mesh screen (not shown) is advantageously attached to the underside of this portion of the cover member to prevent dirt from passing through the holes to the components therebelow.

In addition, the portion of the cover member adjacent to the ear piece well 335 is provided with a rectangular recess 350 for accommodating an opaque telephone number card 250 and a transparent number card cover 260. The number card cover 260 includes a finger 262 at each end thereof that is respectively received by a slot 352 in each end of the recess 350, to secure the number card cover in place. The number card cover 260 overlies the telephone number card 250, thereby holding it in place, and the number card cover completely fills the recess 350 and is flush with the upper surface of the cover member 300, the number card cover being bowed in order to either insert it into or remove it from the recess. The recess 350 has a countersunk fastener hole 354 in the center thereof that is covered by the telephone number card 250 and the number card cover 260.

The upper portion of the cover member 300 further includes a generally rectangular opening 355 circumscribed by a rectangular frame 360 for accommodating the faceplate 200. The faceplate 200 has tabs 210 extending from opposed ends thereof, and the tabs are respectively received by slots 362 (only two which are shown) in associated walls of the frame 360 to secure the faceplate to the cover member 200, the faceplate being bowed to insert the tabs into or remove them from the associated slots. In addition, the faceplate 200 has openings 220 therein through which various components of the telephone stand protrude, and therefore the tabs 210 and slots 362 are located asymmetrically so as to assure that the faceplate can only be secured to the cover member 300 in the proper orientation.

The faceplate 200 when joined to the cover member 300 covers up a plurality of countersunk fastener holes 362 disposed about the perimeter of the recess 360. The fastener holes 362 in conjunction with the fastener hole 354 in the number card recess 350 respectively receive screws (not shown) for securing the cover member 300 to a chassis 410 of the component assembly 400.

The chassis 410 serves as the support for all of the electrical and mechanical components contained within the telephone stand and thus the component assembly 400 in combination with the cover member 300 and faceplate 200 comprises an upper station assembly 600 that incorporates all of the components of the telephone stand aside from the base member 500.

The chassis 410, which is of a size to fit within both the cover member 300 and the base member 500, is a lattice-like member that comprises a pair of spaced side walls 411 and 412 that straddle a pair of spaced intermediate walls 413 and 414, the side walls and intermediate walls extending parallel to one another and orthogonal to a pair of spaced opposed end walls 415 and 416. The shape of the chassis is such that the portion thereof above a datum plane A, shown in FIG. 1, has a different configuration than the portion of the chassis below the datum plane. More specifically, the upper surfaces of the chassis 410 above the datum plane extend at the same angle (i.e., 3°) to the datum plane as the upper surface of the cover member 300 extends to the plane of the flange 330. In addition, the upper surfaces of the chassis 410 have a plurality of holes 417 therein that have the same relationship to one another as the fastener holes 354 and 362 of the cover member 300 have to one another. Furthermore, the portion of the chassis 410 above the datum plane A is shaped so that when the cover member 300 is placed on the chassis with the fastener holes 354 and 362 of the cover member in registration with the holes 417 of the chassis, the upper surface of the cover member extends parallel to the upper surfaces of the chassis and the flange 330 lies in the datum plane A, the wall portions 310, 315, 320 and 325 of the cover member enclosing the portion of the chassis above the datum plane.

The components operated in the utilization of the telephone set are advantageously secured to the upper surfaces of the chassis 410, so that the elements thereof with which the user directly interacts are available at the face of the telephone stand. In the set shown, these components comprise line switch plungers 420, a multibutton selection switch 425, a pushbutton dial 430, a volume control 435, and a multi-button key 440, and when the cover member 300 with the faceplate 200 attached thereto is secured to the chassis 410, the switch hook plungers protrude through the openings 337 in the cover member while the selection switch, the pushbuttons of the dial, a thumb wheel of the volume control, and the buttons of the key protrude through associated openings 220 in the faceplate. Furthermore, because of the above described relationship between the cover member 300 and the chassis 410, the faces of the selection switch 425, dial 430, and key 440 extend parallel to the plane of the faceplate 200.

Other components supported by the portion of the chassis 410 above the datum plane A include a speaker 445 and a handset cord jack 450. The speaker 445 is secured to an upper surface of the chassis 410 that underlies the array of acoustic perforations 345 in the cover member 300, the speaker including a gasket that extends parallel to the plane of the face of the cover member and provides an acoustic seal with the undersurface of the faceplate. The jack 450 is mounted on the end wall 415 so as to be in juxtaposition with an opening 322 in the end wall 320 of the cover member 300, the jack accommodating one end of a plug-ended handset cord (not shown) the other end of which is accommodated by a jack accessible through an opening 110 in the handset 100.

It is seen that, with the exception of the jack 450, all of the components supported on the chassis 410 are mounted within the confines of the side walls 411 and 412 and the end walls 415 and 416. Furthermore, it is seen that because of the height of the side walls 411 and 412 and the end walls 415 and 416, they serve as a protective shield for substantially all of the components mounted on the chassis 410. That is, the height of the walls is such that a substantial portion of each component mounted within the confines of the walls is contained between the upper and lower surfaces of the walls.

Figure 2:
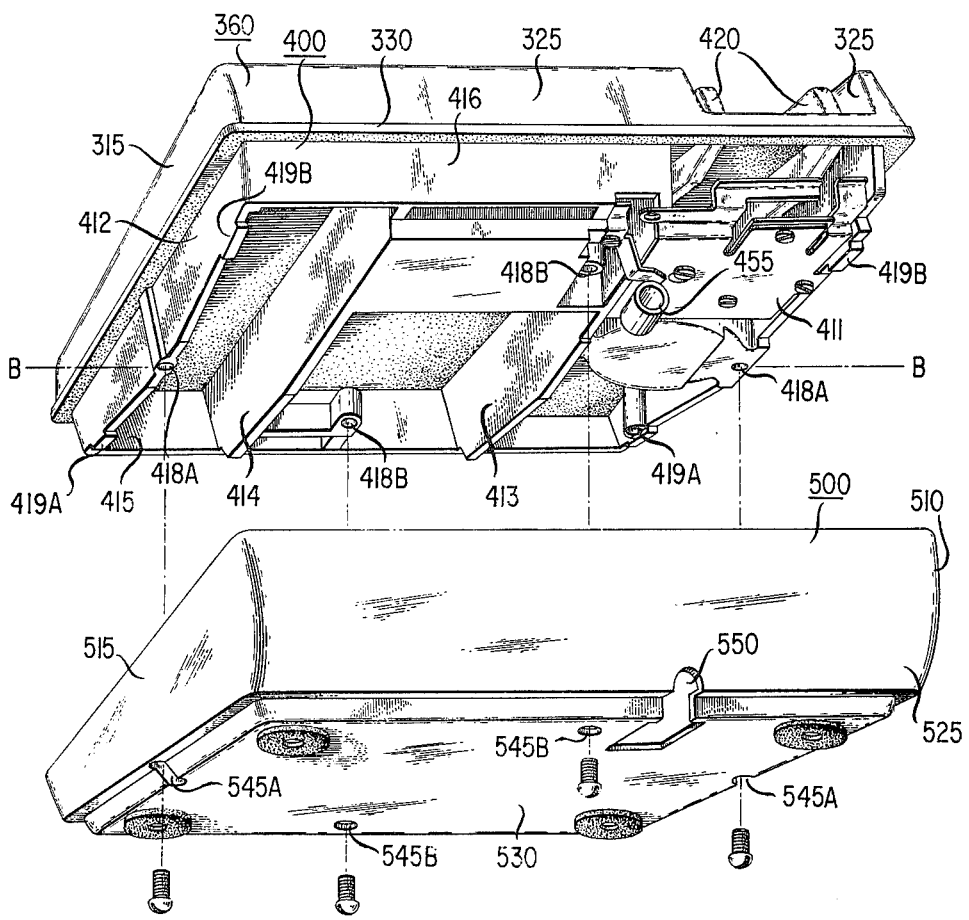
FIG. 2 is an exploded perspective view showing the manner in which the base member is secured to an upper station assembly comprising the combination of the faceplate, cover member, and component assembly.

Referring now also to FIG. 2, the portion of the chassis 410 below the datum plane A is generally symmetrical about a region extending parallel to and approximately midway between the end walls 415 and 416 of the chassis. More specifically, the portion of the side walls 411 and 412 and intermediate walls 413 and 414 below the datum plane A have the greatest height within this mid-region and the walls decrease in height as they approach the end walls 415 and 416. In addition, the bottom of the side walls 411 and 412 each have a fastener hole 418A located along an axis B-B that extends parallel to the end walls 415 and 416 within this midregion and a pair of feet 419A and 419B that are equidistant from this axis. The bottom surfaces of the feet 419A and 419B both extend at an angle of 7 degrees to the datum plane A, but the slopes of the feet are opposite to one another whereby the bottom surfaces of one pair of feet extend at an angle of 14° with respect to the bottom surfaces of the other pair of feet. Finally, the underside of the chassis 410 includes a second pair of fastener holes 418B that straddle and are spaced equidistant both from the axis B—B and from a second axis (not shown) that extends parallel to and midway between the side walls 411 and 412.

As shown in FIG. 1, the base member 500 comprises a hollow rectangular shell including a pair of spaced opposed side wall portions 510 and 515 extending orthogonally to a pair of spaced opposed end wall portions 520 and 525, the wall portions upstanding from a planar bottom portion 530. The lower end of each wall portion 510, 515, 520, and 525 is stepped inwardly toward the opposing wall portion, while the upper surfaces of the wall portions all lie in a common plane, the spacing of the wall portions being such that the upper surfaces thereof register with the bottom surfaces of the corresponding wall portions 310, 315, 320, and 325 of the cover member 300. In addition the end wall portion 525 is of greater height than the end wall portion 520 whereby the base member 500 has a wedge-shaped profile. Furthermore, the plane of the upper surfaces of the wall portions extend at the same angle (i.e., 7°) to the plane of the bottom portion 530 as the bottom surfaces of the feet 419A and 419B of the chassis 410 extend to the datum plane A of the chassis.

The steps at the lower ends of the side wall portions 510 and 515 each have a pad 535 that comprises a raised boss that is adjacent to the end wall portion 520 and a pad 540 that comprises a plurality of posts that are adjacent to the end wall portion 525 (only the pads associated with the side wall portion 510 being shown). The pads 535 and 540 of each side wall portion are spaced the same distance apart as the feet 419A and 419B of the chassis 410. In addition, the upper surfaces of the pads 535 lie in a plane that extends parallel to the plane of the bottom portion 530 while the upper surfaces of the pads 540 lie in a plane that extends at an angle of 14 degrees to the plane of the bottom portion whereby the upper surfaces of the pads 535 and 540 both extend at an angle of 7 degrees to the plane of the upper surface of the wall portions 510, 515, 520, and 525. Furthermore, the distance between the upper surfaces of the pads 535 and 540 and the plane of the upper surfaces of the wall portions 510, 515, 520, and 525 is slightly less than the distance between the bottom surfaces of the feet 419A and 419B and the datum plane A of the chassis 410.

Figure 3:
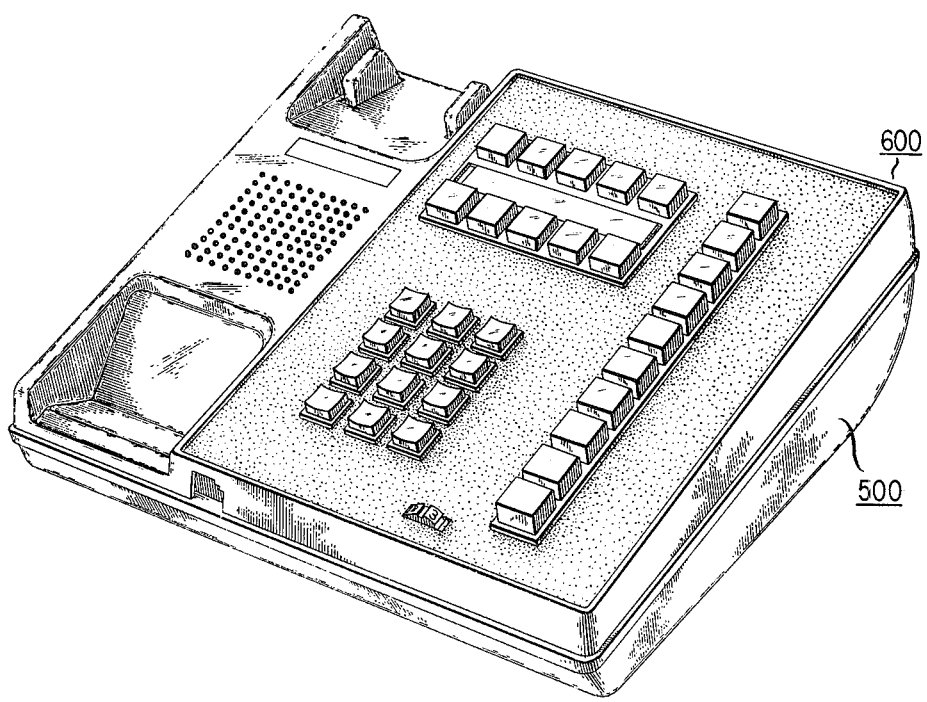
FIG. 3 is a perspective view showing the base member joined to the upper station assembly so as to facilitate use of the telephone stand on a horizontal surface.
Figure 4:
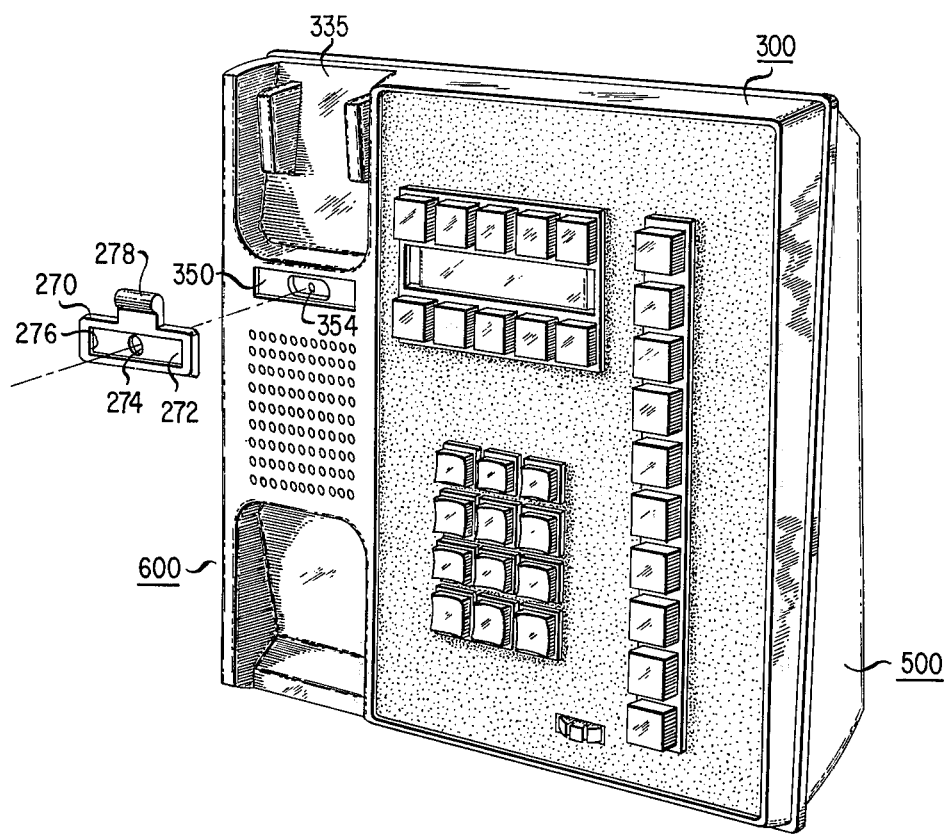
FIG. 4 is a perspective view showing the base member joined to the upper station assembly so as to facilitate use of the telephone stand on a vertical surface, a hook member for supporting the handset being exploded away from the telephone stand.

As a result of the foregoing relationships, when the base member 500 is positioned on the upper station assembly 600 with the pads 535 and 540 in engagement with the feet 419A and 419B of the chassis 410, the plane of the upper surfaces of the wall portions 510, 515, 520, and 525 of the base member extends parallel to and just below the bottom surface of the flange 330 of the cover member 300. In addition, this remains true irrespective of whether the base member 500 is oriented so that the feet 419A engage the pads 535 and the feet 419B engage the pads 540, or whether the base member is rotated 180 degrees so that the feet 419A engage the pads 540 and the feet 419B engage the pads 535. However, as shown in FIG. 3, in the first orientation of the base member 500 the upper surface of the upper station assembly 600 extends at an angle of 10° to the bottom of the base member, which facilitates use of the telephone stand on a horizontal surface. On the other hand, as shown in FIG. 4, in the second orientation of the base member 500 the upper surface of the upper station assembly 600 extends at an angle of −4° to the bottom of the base member which facilitates use of the telephone stand on a vertical surface.

Referring to both FIGS. 1 and 2, the steps at the lower end of the side wall portions 510 and 515 of the base member 500 each have a fastener hole 545A that is in between and equidistant from the adjacent pads 535 and 540. Furthermore, the bottom portion 530 has a pair of fastener holes 545B that have the same spatial relationship with respect to the fastener holes 545A that the fastener holes 418B of the chassis 410 have to the fastener holes 418A. Thus, irrespective of whether the base member 500 is placed in the first or second orientation, the fastener holes 545A thereof register with the fastener holes 418A of the chassis 410 while the fastener holes 545B register with the fastener holes 418B. As a result, the base member 500 can be secured to the upper station assembly 600 in either orientation with the same fastener holes, and when so secured, the feet 419A and 419B of the chassis 410 rest on the pads 535 and 540 of the base member.

Finally, the axis B—B (FIG. 1) extends parallel to and approximately midway between the end wall portions 320 and 325 of the cover member 300, and the components of the upper station assembly 600 located along this axis depend below the bottom surface of the flange 330 a distance that does not exceed the depth of the base member 500 along a corresponding midway axis C—C (FIG. 2). In addition, with one possible exception, the components of the upper station assembly 600 located between the axis B—B and the end wall portions 320 and 325 of the cover member 300 depend below the bottom surface of the flange 330 a distance that does not exceed the depth of the base member 500 at the corresponding location between the axis C—C and the end wall portion 520 of the base member 500. Thus the components of the upper station assembly 600 are accommodated within the base member 500 in either of its orientations. The one possible exception is if a strain relief clamp 455 is provided for the line cord (not shown) of the telephone stand, it might be transferred from one end of the chassis 410 to the other when the base member 500 is rotated from one orientation to the other, the line cord extending through an opening 550 in the base member. Since in this situation the strain relief clamp 455 would always be positioned within the deep end of the base member 500, it could depend below the bottom surface of the flange 330 a greater distance than recited above.

Referring again to FIG. 4, when the base member 500 is mounted on the upper station assembly 600 so as to facilitate the use of the telephone stand on a vertical surface, a hook member 270 is advantageously provided to support the handset 100 (FIG. 1). The back of the hook member 270 includes a boss that fills the number card recess 350 and counter sunk fastener hole 354 in the cover member 300, while the front of the hook member includes a substantially identical number card recess 272 and countersunk fastener hole 274. In addition, the hook member 270 has a slot 276 in each end of the recess 272. Thus the hook member 270 is mounted in place by merely removing the number card cover 260 and number card 250 (FIG. 1) from the recess 350 and the fastener from the fastener hole 354, and then reinserting the fastener in both the fastener holes 275 and 354, whereby the hook member is secured in place. The number card 250 and number card cover 260 are then inserted into the recess 272 in the same manner as with respect to the recess 350. A hook portion 278 of the hook member 270 is then positioned immediately adjacent to the ear piece well 235 of the cover member 300 whereby it is accommodated by a cavity 120 (FIG. 1) in the ear piece of the handset 100 when the handset is placed in an on-hook position on the telephone stand.

Although a specific embodiment of the invention has been shown and described, it will be understood that it is but illustrative and that various modifications may be made therein without departing from the scope and spirit of this invention as defined in the appended claims.

What is claimed is:

1. A telephone stand comprising:

a cover member and a base member that combine to provide a housing;

a plurality of components contained within the housing;

a chassis completely enclosed within the housing, the chassis comprising a lattice-like structure including side and end walls at the periphery thereof and at least one intermediate wall extending therebetween, the walls serving as partitions that define open-ended cubicles within which substantially all of the components are mounted, the height of the side, end, and intermediate walls being such that a substantial portion of each component mounted within the confines of the wall is contained within the volume defined by the upper and lower surfaces of the walls, and the cover member, base member, and certain of the components being fastened to the walls.

2. A telephone stand as in claim 1 wherein the chassis includes a datum plane extending therethrough intermediate the upper and lower surfaces of the walls, the shape of the chassis being such that the portion of the chassis above the datum plane generally conforms to the shape of the cover member and the portion of the chassis below the datum plane is generally symmetrical about a region extending generally parallel to and approximately midway between the end walls of the chassis.

* * * * *